June 20, 1972    L. W. COVER, JR., ET AL    3,671,365
APPRATUS FOR COMPRESSING AND COOLING FIBER BATTS
Filed Jan. 26, 1970    3 Sheets-Sheet 1
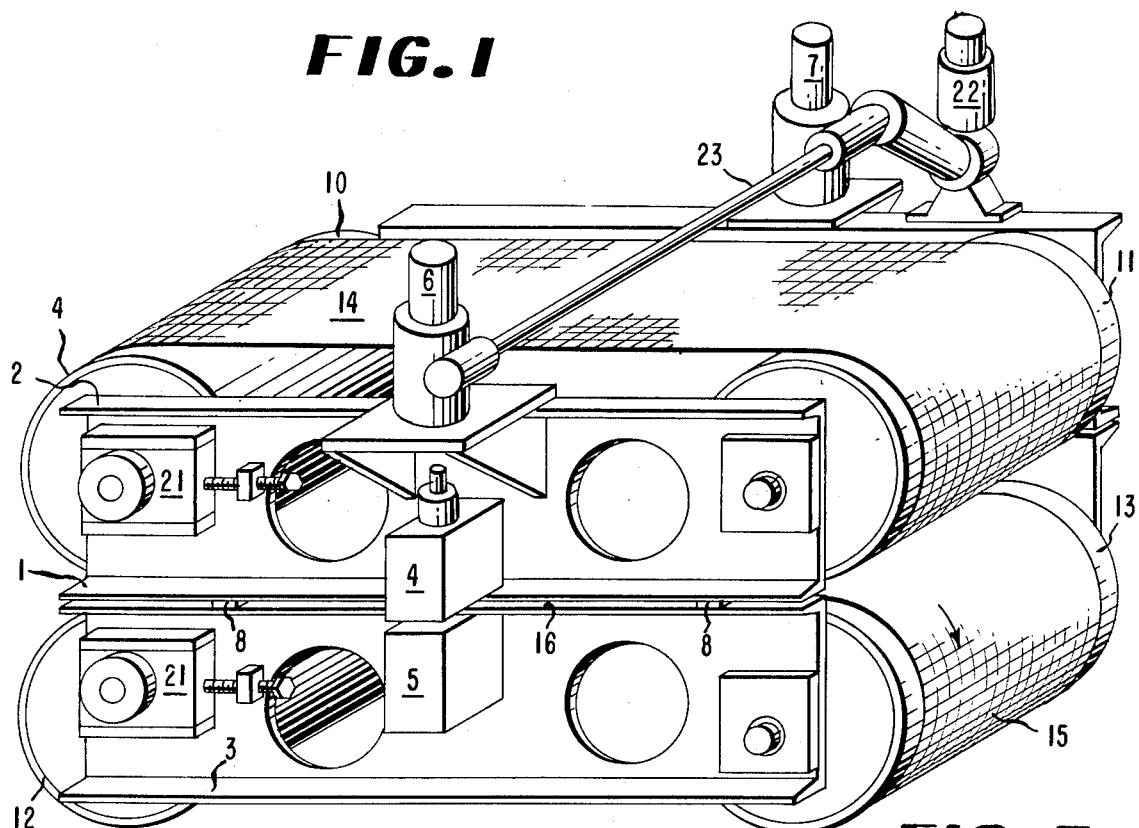
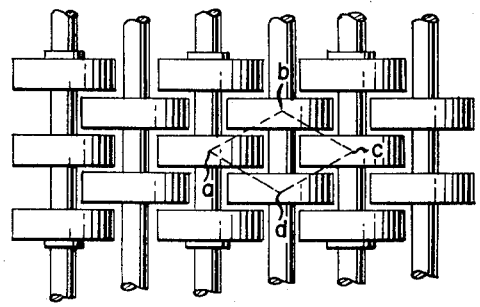
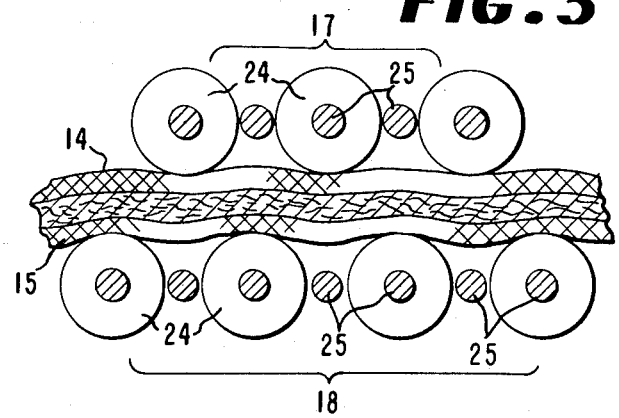
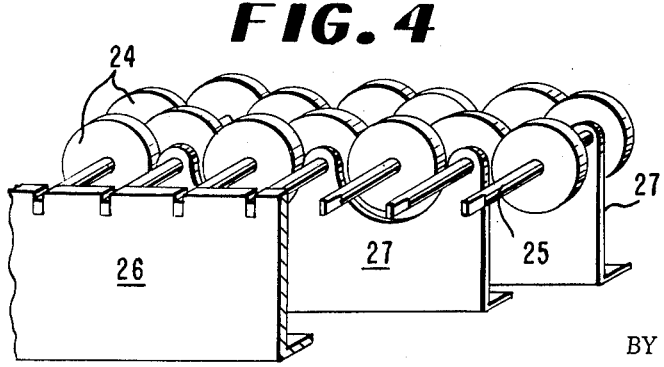
INVENTORS
LLOYD W. COVER JR.
CHARLES C. WEBB
BY Howard P. West Jr.
ATTORNEY June 20, 1972  L. W. COVER, JR., ET AL  3,671,365
APPRATUS FOR COMPRESSING AND COOLING FIBER BATTS
Filed Jan. 26, 1970  3 Sheets-Sheet 2

INVENTORS
LLOYD W. COVER JR
CHARLES C. WEBB

BY *Howard P. West Jr.*
ATTORNEY

June 20, 1972 L. W. COVER, JR., ET AL 3,671,365
APPARATUS FOR COMPRESSING AND COOLING FIBER BATTS
Filed Jan. 26, 1970 3 Sheets-Sheet 3
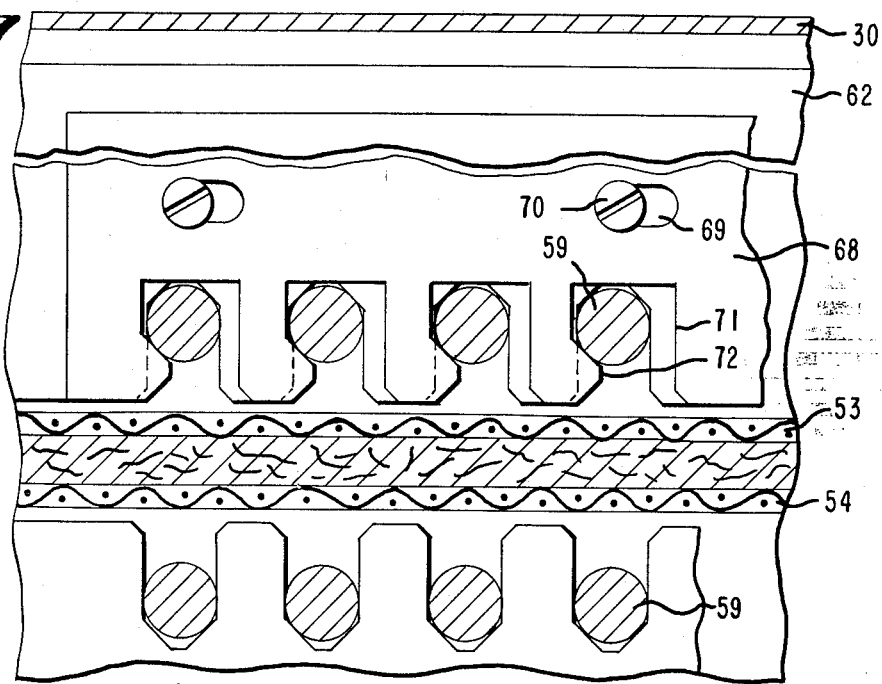
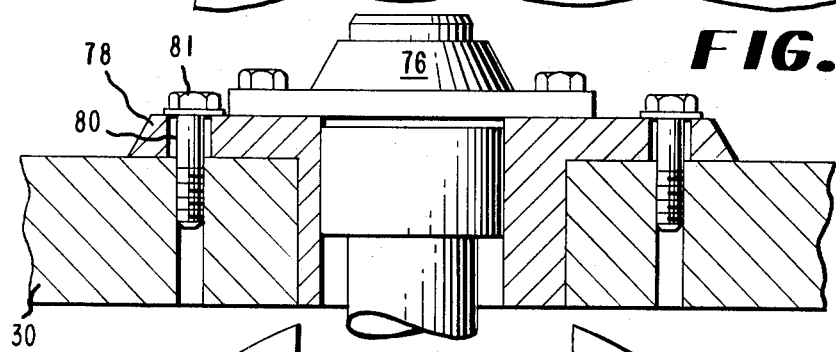
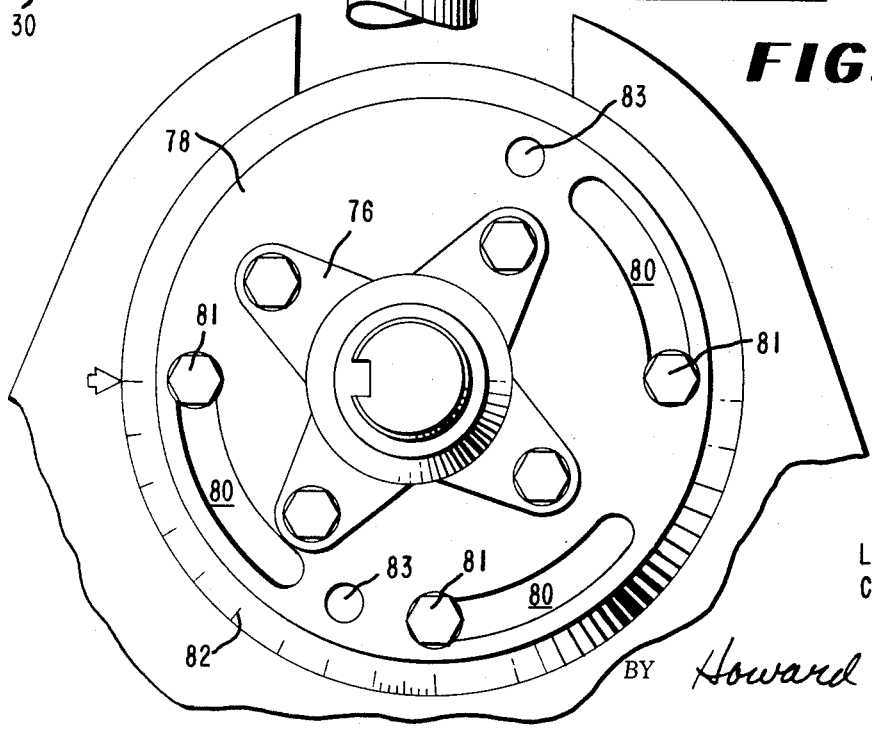
INVENTORS
LLOYD W. COVER JR.
CHARLES C. WEBB
BY Howard P. West Jr.
ATTORNEY

United States Patent Office 3,671,365
Patented June 20, 1972

3,671,365
APPARATUS FOR COMPRESSING AND COOLING FIBER BATTS
Lloyd W. Cover, Jr., and Charles C. Webb, Wilmington, Del., assignors to E. I. du Pont de Nemours and Company, Wilmington, Del.
Filed Jan. 26, 1970, Ser. No. 5,542
Int. Cl. B30b 3/04; D21f 1/40
U.S. Cl. 156—580         5 Claims

ABSTRACT OF THE DISCLOSURE

An apparatus for compressing and cooling fibrous batts that includes spaced movable parallel belts supported by opposed roller support platens and driven by pairs of spaced nip rolls. Each roller support platen comprises a plurality of rollers positioned in an overlapping staggered relationship with respect to each other with the opposed platens being positioned in a staggered relationship to each other to reduce belt deflection. An eccentric adjustment means attached to the entrance nip rolls is used to vary the gap between these rolls so that fibrous batts carried by the belts may be subject to an initial momentary high compression load.

BACKGROUND OF THE INVENTION

This invention relates to an improved apparatus for compressing and cooling heated nonwoven fibrous batts as they emerge from a drying oven. The apparatus is particularly useful for preparing pneumacel-fiber batts of predetermined thickness having a calendered flat or embossed surface pattern. These batts, described in British Patent No. 1,145,932, are useful as padding or cushioning for carpets, upholstery and mattresses.

Several machines are known in the art for compressing and cooling heated fibrous batts. These frequently require sliding contact of the batt and the apparatus. Others do not maintain the thickness of the compression-cooling zone sufficiently constant. The apparatus of this invention provides means for continuously compacting and cooling fibrous batts such that sliding contact of the batt with the apparatus, with its accompanying potentially damaging effect on the batt, is avoided and the thickness of the compression-cooling zone is maintained substantially constant.

SUMMARY OF THE INVENTION

An apparatus for continuously compressing and cooling fiber batts that includes a pair of belts traveling in a substantially spaced parallel relationship through a frame, the belts have cooperative reaches for carrying the fibrous batts from an entrance through a cooling zone to an exit in the frame. Opposed support platens attached to the frame and positioned behind the cooperative reaches of tthe belts maintain a constant spacing between the belts when they are forwarding the batts, and a pair of nip rolls attached to the entrance of the frame and positioned behind the cooperating belt reaches are mounted in eccentric support means connected to the frame for varying the gap between the nip rolls. Each of the platens comprise a plurality of rollers positioned in a staggered overlapping relationship and each of the platens are positioned in a staggered relationship with respect to each other. The frame is formed of two sections which are capable of being moved toward and away from each other to vary the distance between the belts.

BRIEF DESCRIPTION OF THE DRAWINGS

FIG. 1 is a schematic perspective view of the apparatus for processing a fibrous product through a compression zone.

FIG. 2 shows a partial plan schematic view of the lower antifriction roller support platen that supports one of the traveling foraminous belts in the compression zone.

FIG. 3 shows a partial schematic elevation of the upper and lower support platen arrangement within the compression zone including the foraminous belts and a non-woven product therebetween.

FIG. 4 shows schematically a segment of the lower antifriction roller support platen and shaft supports wherein the individual shaft ends are machined flat and are constrained in open slots in the end plates. A representative number of mid-span antideflection supports are shown. These are affixed to rigid cross braces or briding sections built into the enclosure.

FIG. 7 shows a detail view of a center locking bar for constraining the roller shafts in the upper platen.

FIG. 8 is a section view of FIG. 9.

FIG. 9 is an enlarged view of the eccentric shaft bearing of FIG. 5 for varying the belt roll nip gap at the entrance.

DETAILED DESCRIPTION OF THE INVENTION

Figure 5:
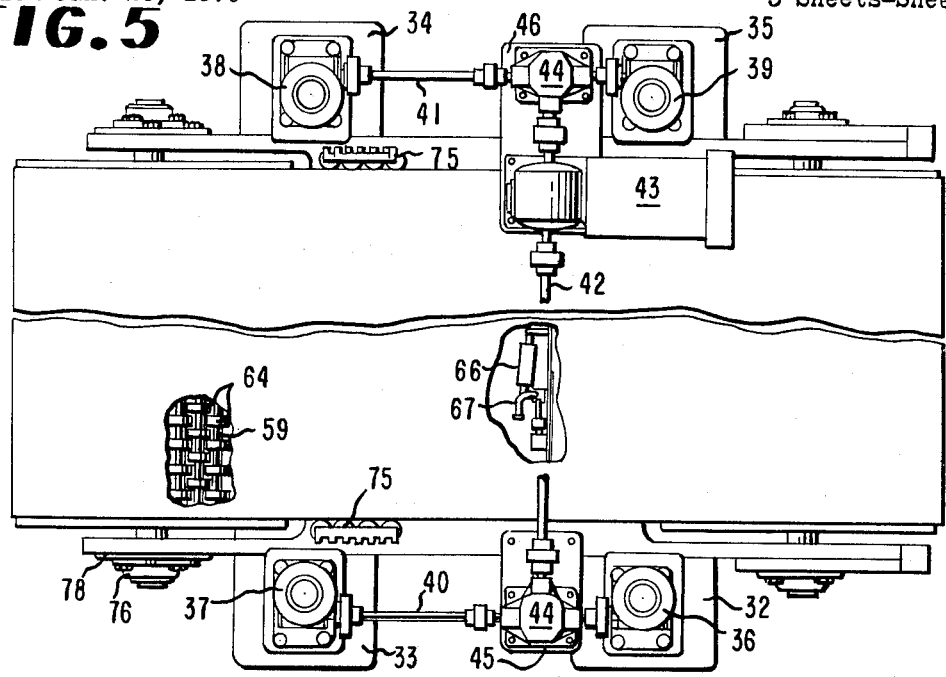
FIG. 5 is a plan view of FIG. 6 partially opened to show the platen roller shaft mounting included an upper platen shaft locking arrangement.

As shown in FIG. 1, one embodiment of the apparatus comprises a rigid main frame 1 having identical upper end lower enclosures or sections 2, 3 that are aligned one above the other on vertical guide posts 4, 5 and adjustable screw jacks 6, 7. The screw jacks 6, 7 serve as means for varying the gap height or spacing (i.e., moving sections 2, 3 toward or away from each other) and thereby the compressive loading on the conveyed batt material. This spacing is maintained precisely during the operation of the machine by spacer blocks or pads 8 located on the four corners. Each enclosure 2, 3 supports a pair of belt rolls 10, 11 on the upper and 12, 13 on the lower. The rolls are large diameter elements with end shafts rotatably mounted to the respective enclosures. Traveling around rolls 10, 11 is a lightweight endless stainless steel wire screen belt 14 and around rolls 12, 13 an identical wire screen belt 15. Both belts coact in the space between the upper and lower enclosure 2, 3 and form an extended constant height nip section within the frame hereafter referred to as cooling zone 16. As shown in FIG. 3, each belt is supported on the back side in the cooling zone 16 by an antifriction roller support platen 17 and 18. As will be apparent later in the description, these platens are designed to carry the high compression loading with a minimum of belt deflection and frictional drag in the cooling zone 16. The belts are driven in the directions indicated by the arrows by rolls 11, 13 which are in turn driven by conventional drive means (not shown). Belt rolls 10, 12 at the exit end of the machine are rotatably journaled in antifriction bearing blocks that are mounted on adjustable dove tail slides 21 which permit increasing the roll spacing to increase the belt tension. Motorized up and down movement of enclosure 2 is obtained by a jack motor 22 which is coupled to the input end of the jacks by a common drive shaft 23.

As shown in FIGS. 2, 4, each platen 17, 18 is composed of a plurality of uniform diameter rollers 24, mounted on shafts 25. The shafts 25 are spaced a minimum distance apart in end plates 26 and are supported at regular intervals from end to end by center supports 27 so that there is formed a bed of interdigitating rolling members. Each platen, in turn, is fixedly attached to the respective enclosure surfaces facing the cooling zone 16.

The close spacing of rollers 24 establishes a support configuration (FIG. 2) wherein every elemental area of a belt is supported by four contact points (e.g., a–d FIG. 2) of minimum equal distance apart. This arrangement provides for maximum support which in combination with a staggered pattern between the upper and lower platens (FIG. 3) results in high load carrying capabilities with relatively low unit loading and substantially no belt deflection between supports. This is an important feature of the machine because any nonplanar, nonparallel deflection of the belts 14, 15 in the cooling zone 16 is readily set into the product either as nonuniform thickness or warpage which can result in unacceptable product.

In operation, a heated, tacky web of nonwoven fibrous material is introduced into the nip of the belts 14, 15. The product is then conveyed through the cooling zone 16 sandwiched between the belts (FIG. 3) having a preset gap height which will yield the final thickness desired in the batt and cooled by means of an airstream circulating from enclosure 3 up through the sandwich to enclosure 2. In certain situations, an overlay belt (not shown) containing an embossing pattern can be used along with the flat belts 14, 15 to produce a textured product. The overlay belt can be constructed of woven mesh wire but preferably is a perforated elastomeric material.

Figure 6:
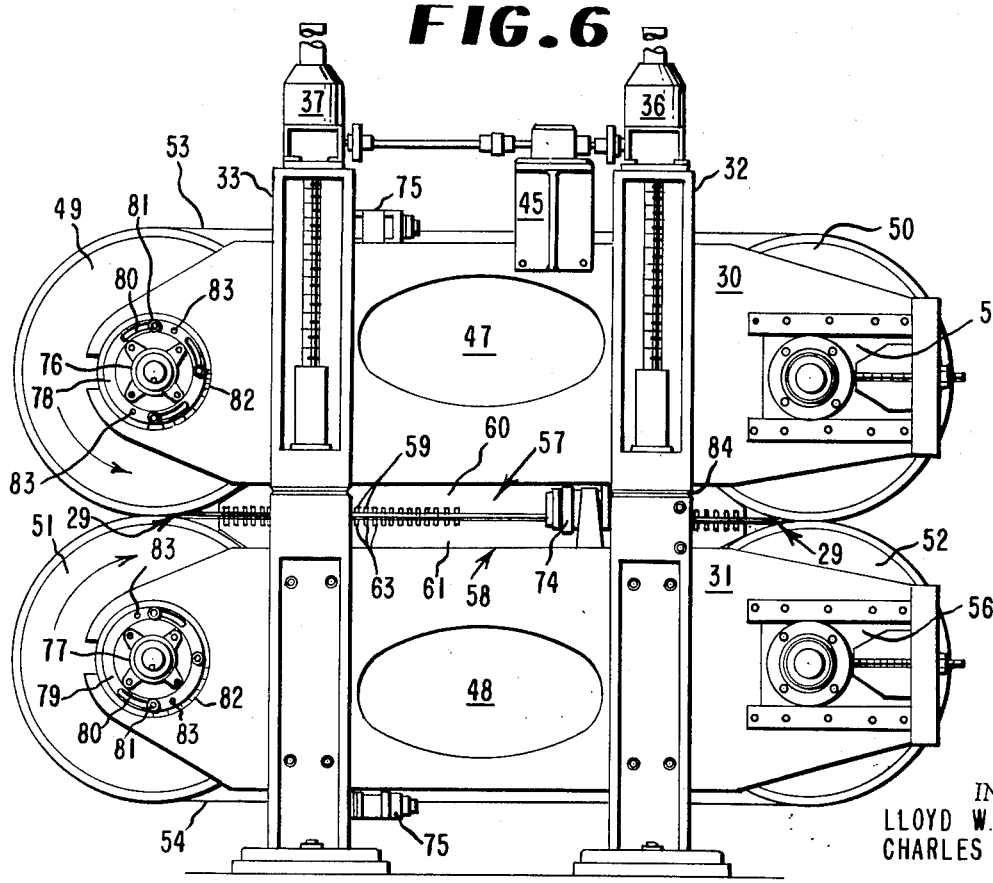
FIG. 6 shows a side elevation view of the preferred embodiment of the apparatus. The apparatus includes an eccentric shaft bearing mount at the entrance end for varying the nip gap spacing between the upper and lower belt rolls.

FIGS. 5 and 6 shows the preferred embodiment of the apparatus. Upper and lower frame enclosure 30, 31 are supported at the corners by uprights 32, 33, 34 and 35. Each upright is split into two sections and each is connected together by heavy duty jack screws 36, 37, 38 and 39. Each jack is operatively connected by means of connector shafts 40, 41 to a drive shaft 42 which is coupled to the output of an electric motor 43. In particular, jacks 36, 37 are linked together to drive shaft 42 through miter gear boxes 44 that are mounted on brackets 45, 46.

Both enclosures 30, 31 are generally rectangular boxlike structure with end extensions for mounting large diameter rolls. Air supply and exhaust ports 47, 48, respectively, communicate with interior and external air ducts (not shown). A stream of cool, low pressure air is introduced through port 48, circulated through enclosure 31 upward into enclosure 30 and out through port 47. Mounted at the ends of both enclosures are belt rolls 49–52. Belt rolls 49, 50 are journalled in enclosure 30 and rolls 51, 52 are in enclosure 31. Traveling around the pairs of rolls are identical endless belts 53, 54. Both belts are high strength, stainless steel wire structures. The structure of each belt can be woven to exhibit an openness area of, for example, about 69 percent. To maintain sufficient tension, belt rolls 50, 52 are journaled in antifriction bearing blocks which are mounted on linear adjustment slides 55, 56. These slides are provided with a lead screw adjustment means which enable incremental outward movement of the rolls for increasing the tension of belts 53, 54.

In the cooling zone 29, the back side of each belt is supported by opposed antifriction roller platens 57, 58. As shown in FIG. 6, each platen is composed of a plurality of slender nonrotating shafts of axles 59 mounted in end plates 60, 61. A typical end portion of a nonrotating axle 59 is machined to a flat key that fits in a matching open slot 63 in the end plates 60, 61. Mounted on each axle 59 is a plurality of closely spaced antifriction rollers 64 that are held in an ordered spacing by a resin binder applied between the inner race and the axle. The axles 59 are spaced parallel and are a minimum distance apart to form a substantially continuous planar bed of freely rotatable members.

Both platens are affixed to the respective enclosures by means of the end plates 60, 61 and mid-supports 62. Enclosures 30, 31 are suitably designed for stiffness by bridging 65 which also serve as mounting surfaces for the antideflection mid-supports 62. In the case of upper platen 57, a special locking mechanism is provided to facilitate assembly and disassembly of the roller axles 59. This locking mechanism is shown in FIGS. 6, 7 and comprises a pneumatic actuator 66 fixedly mounted at one end to a mid-support 62 and at the other end to a toggle latch 67 that, in turn, is secured to a locking bar 68. As best shown in FIG. 7, locking bar 68 is essentially a slidable flat plate held contiguous to a mid-support 62 within elongated slots 69 by threaded studs 70. The operative edge of bar 68 is modified by a plurality of open grooves 71 containing projecting shanks 72 which lock the individual axles in place when actuated by pneumatic actuator 66. During disassembly procedures, the roller arrangement of upper platen 57 is locked in place by the interaction of actuator 66, toggle 68, and locking bar 68 thus enabling removal of the platen with minimum disturbance of the axle 59 assemblage.

Both belts 53, 54 are driven by rolls 49, 51, which are coupled at one end opposite to that shown in FIG. 5 to the output of a commercial variable speed drive unit (not shown).

Lateral movement of belts 53, 54 is controlled by edge guides 74, 75 which are essentially pairs of rolls journaled on a whiffle-tree arrangement of brackets that maintain the belt travel along a prescribed path. Belt rolls 49, 51 are rotatably journaled in special shaft bearings 76, 77 which provide for varying the nip gap spacing. As shown in FIGS. 5, 8 and 9, bearings 76, 77 are retained in adjustment flanges 78, 79 which contain bore openings that are eccentric to the centerline axis of the bearings (e.g., by about 0.2 inch). Each flange is provided with elongated arcuate slots 80 for mounting bolts 81 to permit angular adjustment of the flanges for varying amounts of eccentricity. This is measured on graduated scale 82. Precision incremental movement is made by means of a spanner wrench which engages holes 83.

The eccentric adjustment permits reducing the nip gap space between rolls 49, 51 so that the batt may be subjected initially to a compression load in excess of the amount experienced between the platens 57, 58. The nip spacing between the rolls can be varied, for example, by as much as 0.4 inch. This additional squeeze makes it possible to set the batt thickness to within the desired limits. In the absence of the initial momentary compression, a batt of high spring-back, compressed in the cooling zone 29 to the desired thickness, upon exiting from the apparatus undergoes a substantial recovery or spring-back. By momentarily compressing this batt at the entrance end, it tends to recover to the height of the narrow cooling zone 29 and subsequently stabilizes at the desired thickness before it reaches the exit A.

Prior to actual processing of fibrous batt product, a number of startup adjustments must first be made. For example, precision metal shims 94 are inserted between the split portions of the uprights in accordance with the desired gap space separating the upper and lower platens 57, 58. This separation in effect determines the preset thickness of the final product. At this point, the power driven jack screws are actuated and enclosure 30 is lowered from a maximum height of, for example, ten inches above the lower platen 58 down against the shims 84. Platens 57, 58 withstand heavy compressive loads by virtue of the uniform planar contact made with each antifriction roller. For example, the unit load carried by each roller 64 with the product in the cooling zone 29 can be between 30 pounds in the cooling zone to 200 pounds per linear inch at the nip between rolls 49, 51.

After the belts 53, 54 are set in motion at a speed of between about 15 to 100 feet per minute, the heated and tacky fibrous batt product is fed into the nip of rolls 49, 51. There it undergoes a momentary high compression squeeze whereupon it continues between the belts through the uniform height cooling zone 29, and recovers to the desired thickness as cooling air is circulated through the sandwich array at the rate of, for example, about 300 cubic feet per minute per square foot. For some applications, the compressive load between the enclosures 30, 31 approaches 60 tons. Since the weight of enclosure 30 and its support equipment can be less than nine tons, the major portion of compression loading must be applied by the screw jacks 36, 37, 38 and 39. For this reason each jack is power driven and capable of carrying about 20 tons of force.

What is claimed:

1. In an apparatus for continuously compressing and cooling fiber batts that includes a pair of belts traveling in substantial spaced parallel relationship through a frame, said belts having cooperative reaches for carrying the fibrous batts through a cooling zone in the frame, opposed support platens attached to the frame and positioned behind the cooperative reaches of the belts for maintaining a constant spacing between the belts and a pair of nip rolls attached to the entrance of the frame and positioned behind said reaches, the improvement comprising: eccentric support means connected between said frame and said nip rolls for varying the gap between the nip rolls a precise amount, said eccentric support means including means for measuring said amount.

2. The apparatus as defined in claim 1, each of said platens being roller support platens comprising a plurality of rollers positioned in a staggered overlapping relationship, the rollers of each of said platens being positioned in a staggered relationship with respect to corresponding rollers of the other platen.

3. In an apparatus for continuously compressing and cooling pneumacel-fiber batts that includes a pair of driven foraminous belts traveling in a substantial spaced parallel relationship through a frame, said belts having cooperative reaches for carrying the fibrous batts from an entrance through a cooling zone to an exit in the frame, opposed support platens attached to the frame and positioned behined the cooperative reaches of the belts for maintaining a constant spacing between the belts when they are forwarding said batts, and a pair of nip rolls attached to the entrance of the frame and positioned behind said reaches, the improvement comprising: eccentric support means connected between said frame and said nip rolls for reducing the gap between the nip rolls to a value less than the spaced distance between the belts, each of said platens being roller support platens comprising a plurality of interdigitating rollers, the rollers of each of said platens being positioned in a staggered relationship with respect to the rollers of the other platen said eccentric support means including means for measuring said value.

4. The apparatus as defined in claim 3 including another pair of nip rolls attached to the exit end of said frame, said belts being foraminous, endless and traveling about the rolls of each pair.

5. The apparatus as defined in claim 4, said frame being comprised of upper and lower sections, one roll of each of said pairs being in each section and including means for moving said sections toward and away from each other.

References Cited
UNITED STATES PATENTS

| | | | |
|---|---|---|---|
| 2,697,473 | 12/1954 | Techtmann | 156—498 |
| 1,764,456 | 6/1930 | Mantius | 162—301 |
| 1,361,970 | 12/1920 | Dickey | 156—311 |

BENJAMIN A. BORCHELT, Primary Examiner

J. J. DEVITT, Assistant Examiner

U.S. Cl. X.R.

156—311; 162—301